US006953060B2

(12) United States Patent
Pan et al.

(10) Patent No.: US 6,953,060 B2
(45) Date of Patent: Oct. 11, 2005

(54) SUBSTRATE WITH EXTERNAL MEMBER

(75) Inventors: Sean X. Pan, Penfield, NY (US); Mark S. Thomas, Williamson, NY (US); Mark C. Petropoulos, Ontario, NY (US)

(73) Assignee: Xerox Corporation, Stamford, CT (US)

(*) Notice: Subject to any disclaimer, the term of this patent is extended or adjusted under 35 U.S.C. 154(b) by 621 days.

(21) Appl. No.: 10/021,030

(22) Filed: Dec. 19, 2001

(65) Prior Publication Data

US 2003/0113470 A1 Jun. 19, 2003

(51) Int. Cl.[7] .................................................. F16L 9/00
(52) U.S. Cl. ..................... 138/109; 138/146; 428/430.1
(58) Field of Search ................................ 138/109, 146; 428/430.1

(56) References Cited

U.S. PATENT DOCUMENTS

| | | | | | |
|---|---|---|---|---|---|
| 3,050,087 | A | * | 8/1962 | Caplan | 138/121 |
| 4,016,640 | A | * | 4/1977 | Briggs | 29/450 |
| 4,627,808 | A | * | 12/1986 | Hughes | 425/270 |
| 5,385,759 | A | | 1/1995 | Crump et al. | 427/430.1 |
| 5,578,410 | A | | 11/1996 | Petropoulos et al. | 430/133 |
| 5,633,046 | A | | 5/1997 | Petropoulos et al. | 427/430.1 |
| 5,667,928 | A | * | 9/1997 | Thomas et al. | 430/134 |
| 5,683,742 | A | | 11/1997 | Herbert et al. | 427/11 |
| 5,957,163 | A | * | 9/1999 | Ito et al. | 138/109 |
| 6,079,452 | A | * | 6/2000 | Touzel et al. | 138/149 |
| 6,132,810 | A | | 10/2000 | Swain et al. | 427/430.1 |
| 6,503,571 | B1 | * | 1/2003 | Bonino et al. | 427/430.1 |
| 6,576,299 | B1 | * | 6/2003 | Pan et al. | 427/430.1 |
| 2002/0174906 | A1 | * | 11/2002 | Katayama et al. | 138/109 |
| 2003/0113469 | A1 | * | 6/2003 | Pan et al. | 427/430.1 |

OTHER PUBLICATIONS

Philip G. Perry et al., U.S. Serial No. unassigned, "Substrate With Recessed Surface Portion" (D/A0438Q), Dec. 2001.
Sean X. Pan et al., U.S. Serial No. unassigned, "Substrate With Raised Surface Portion" (D/A0438Q1), Dec. 2001.
Sean X. Pan et al., U.S. Serial No. unassigned, "Coating Method" (D/A0892), Dec. 2001.

* cited by examiner

*Primary Examiner*—James Hook
(74) *Attorney, Agent, or Firm*—Zosan S. Soong

(57) ABSTRACT

An apparatus comprising:
(a) a substrate including a level intermediate region disposed between a first end region and a second end region;
(b) a first external member disposed circumferentially around the first end region in a continuous manner and protruding above the level intermediate region, thereby resulting in a deposition region including the surface of the first external member covering the first end region, an optional exposed first end region portion, and the intermediate region; and
(c) a dip coated layer over the entire deposition region, wherein the portion of the dip coated layer over the first external member and the optional exposed first end region portion is formed prior to the portion of the dip coated layer over the intermediate layer.

19 Claims, 6 Drawing Sheets

SUBSTRATE WITH EXTERNAL MEMBER

BACKGROUND OF THE INVENTION

When a photoreceptor is dip coated, the layer thickness increases slowly to a target value after the takeup speed reaches a constant value. The resulting non-uniformity in layer thickness is called "sloping." "Sloping" of the deposited layer over the imaging area of the photoreceptor is undesirable since it can degrade the performance of the photoreceptor. To prevent the deposited layer from exhibiting "sloping" in the imaging area, one can use a longer substrate to provide a longer non-imaging area so that the "sloping" of the deposited layer occurs only in the non-imaging area while the deposited layer exhibits relatively uniform thickness in the imaging area. However, a longer substrate and a longer non-imaging area increase costs since more materials have to be used in the substrate and the deposited layer or layers. Thus, there is a need, which the present invention addresses, for new methods to eliminate or reduce the above described problem.

Coating methods and apparatus are described in Petropoulos et al., U.S. Pat. No. 5,633,046; Herbert et al., U.S. Pat. No. 5,683,742; Swain et al., U.S. Pat. No. 6,132,810; Petropoulos et al., U.S. Pat. No. 5,578,410; and Crump et al., U.S. Pat. No. 5,385,759.

SUMMARY OF THE INVENTION

The present invention is accomplished in embodiments by providing an apparatus comprising:

(a) a substrate including a level intermediate region disposed between a first end region and a second end region;

(b) a first external member disposed circumferentially around the first end region in a continuous manner and protruding above the level intermediate region, thereby resulting in a deposition region including the surface of the first external member covering the first end region, an optional exposed first end region portion, and the intermediate region; and (c) a dip coated layer over the entire deposition region, wherein the portion of the dip coated layer over the first external member and the optional exposed first end region portion is formed prior to the portion of the dip coated layer over the intermediate layer.

There is also provided in embodiments an apparatus comprising:

(a) a substrate defining a longitudinal axis and including a level intermediate region disposed between a first end region and a second end region;

(b) a plurality of external members, each of the external members protruding above the level intermediate region and disposed only partially around the first end region, wherein the plurality of the external members, when viewed at a substrate end view, collectively extend circumferentially around the first end region in a continuous manner, thereby resulting in a deposition region including the surfaces of the external members covering the first end region, an optional exposed first end region portion, and the intermediate region; and (c) a dip coated layer over the entire deposition region, wherein the portion of the dip coated layer over the external members and the optional exposed first end region portion is formed prior to the portion of the dip coated layer over the intermediate layer.

In additional embodiments, there is provided a coating method comprising:

(a) providing an apparatus including:

(i) a substrate including a level intermediate region disposed between a first end region and a second end region;

(ii) a first external member disposed circumferentially around the first end region in a continuous manner and protruding above the level intermediate region, thereby resulting in a deposition region including the surface of the first external member covering the first end region, an optional exposed first end region portion, and the intermediate region; and (b) dip coating a layer of a coating solution over the entire deposition region, wherein the portion of the dip coated layer over the first external member and the optional exposed first end region portion is formed prior to the portion of the dip coated layer over the intermediate layer.

BRIEF DESCRIPTION OF THE DRAWINGS

Unless otherwise noted, the same reference numeral in different Figures refers to the same or similar feature.

DETAILED DESCRIPTION

As used herein, the phrase "coating solution" encompasses any fluid composition including the liquid medium and the coating material regardless of the extent that the coating material may be dissolved in the liquid medium.

As seen in the Figures, the substrate (2A, 2B, 2C, 2D, 2E), having a longitudinal axis X, includes an optional uncoated region (8A, 8B, 8C, 8D) and an intermediate region (10A, 10B, 10C, 10D, 10E) disposed between a first end region (12A, 12B, 12C, 12D, 12E) and a second end region (14A, 14B, 14C, 14D, 14E). In embodiments where the substrate is part of an electrostatographic imaging member (e.g., a photoreceptor), one or more of the first end region, the second end region, and the optionally uncoated region may correspond to a non-imaging area of the imaging member, whereas the imaging area of the imaging member includes at least the intermediate region and optionally one or both of the first end region and the second end region. In embodiments, the first end region, the second end region, and the optional uncoated region correspond to the non-imaging area of the imaging member, and the intermediate region corresponds to the imaging area. A deposition region (6A, 6B, 6C, 6D, 6E) includes the intermediate region, the surface of external member or members (18A–E, 19D–E, 20A–D) covering the first end region and the second end region, and any optional exposed portion of the first end region and the second end region not covered by the external member or members.

As used herein, the term "external" as in "external member" indicates that the member is a separately created component which is moved into position onto the substrate surface, i.e., the external member is not a surface feature created from the substrate.

Figure 1:
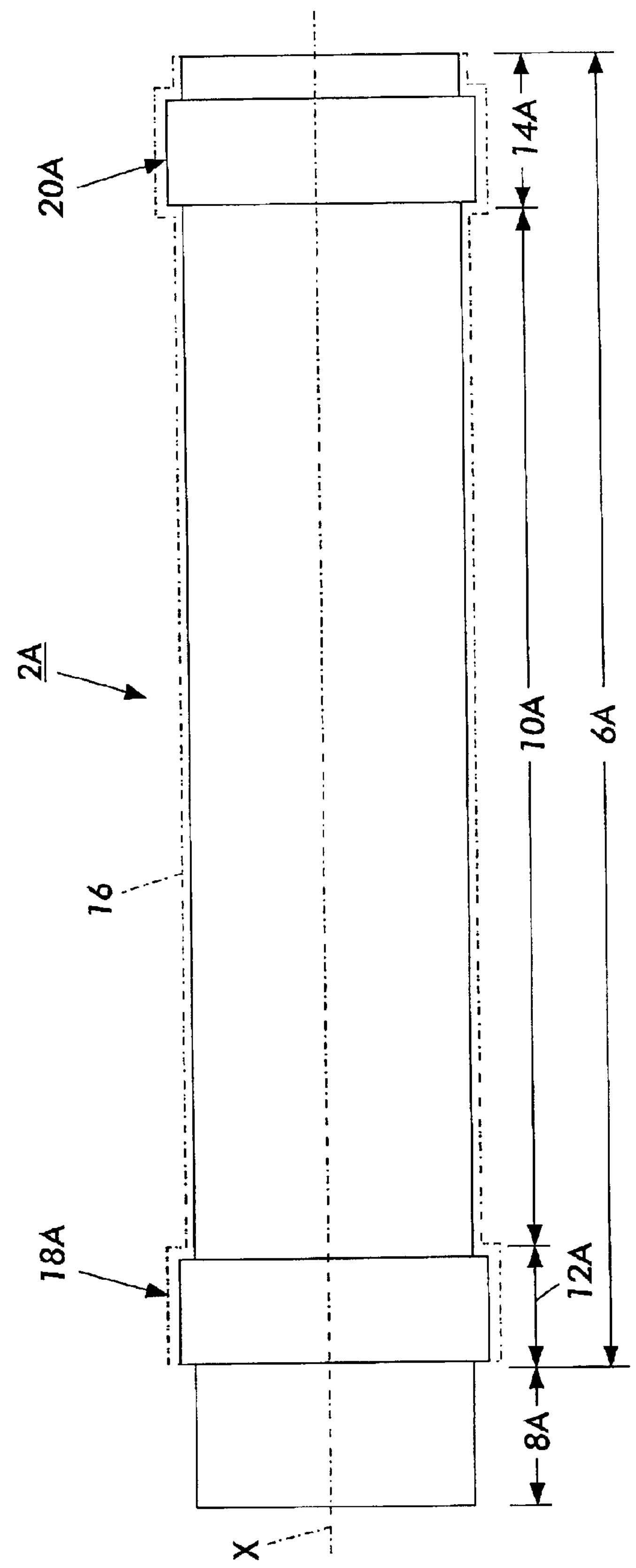
FIG. 1 is an elevational view of a first embodiment of the present coated substrate.

In FIG. 1, the first end region 12A includes a first external member 18A which is depicted as a single band having a rectangular shape when viewed in cross section along the longitudinal axis that is disposed circumferentially around the first end region in a continuous manner. The second end region 14A optionally includes a second external member 20A similar or dissimilar to the first external member. In FIG. 1, the second external member 20A is depicted as a single band having a rectangular shape when viewed in cross section along the longitudinal axis that is disposed circumferentially around the second end region in a continuous manner. In FIG. 1, a dip coated layer 16 is formed over the entire deposition region.

Figure 2:
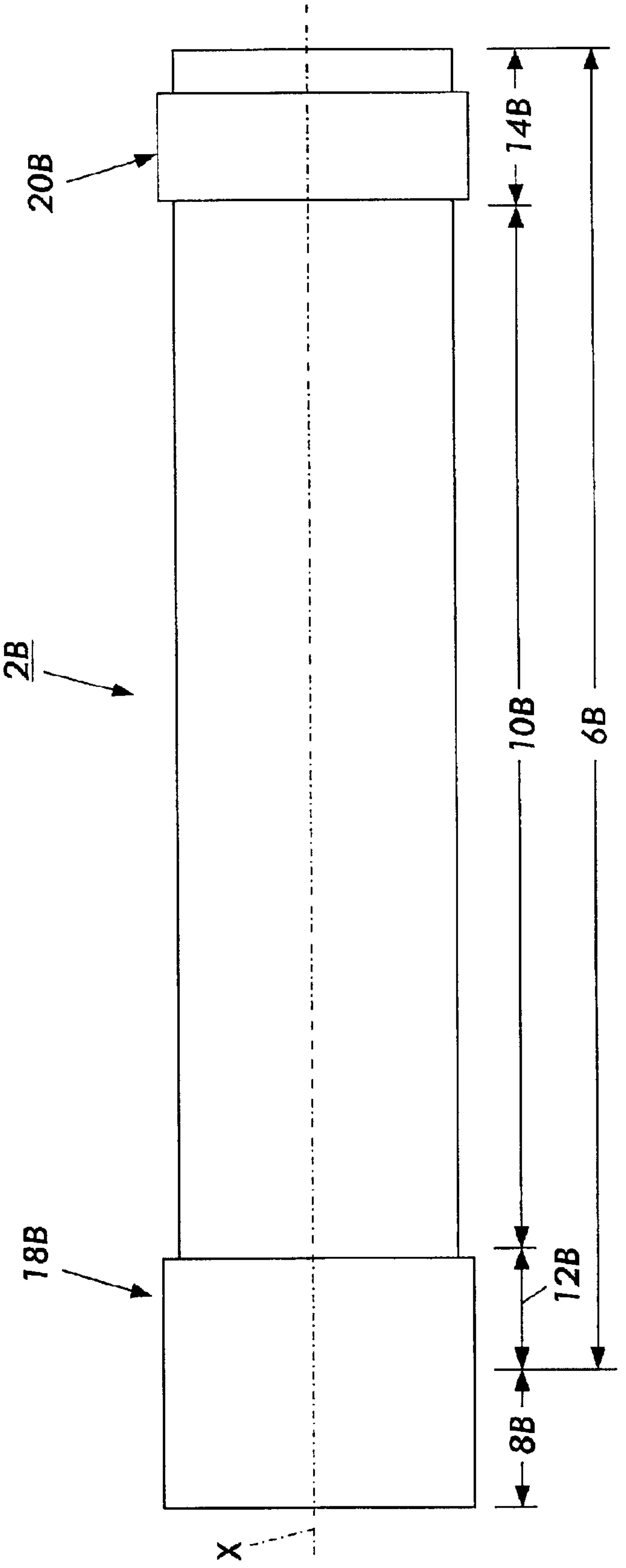
FIG. 2 is an elevational view of a second embodiment of the substrate useful in the present invention.

In FIG. 2, the first external member 18B is depicted as a single band having an elongated rectangular shape when viewed in cross section along the longitudinal axis that is disposed circumferentially around the first end region 12B and the uncoated region 8B in a continuous manner. In FIG. 2, the second external member 20B is depicted as a single band having a rectangular shape when viewed in cross section along the longitudinal axis that is disposed circumferentially around the second end region in a continuous manner.

Figure 3:
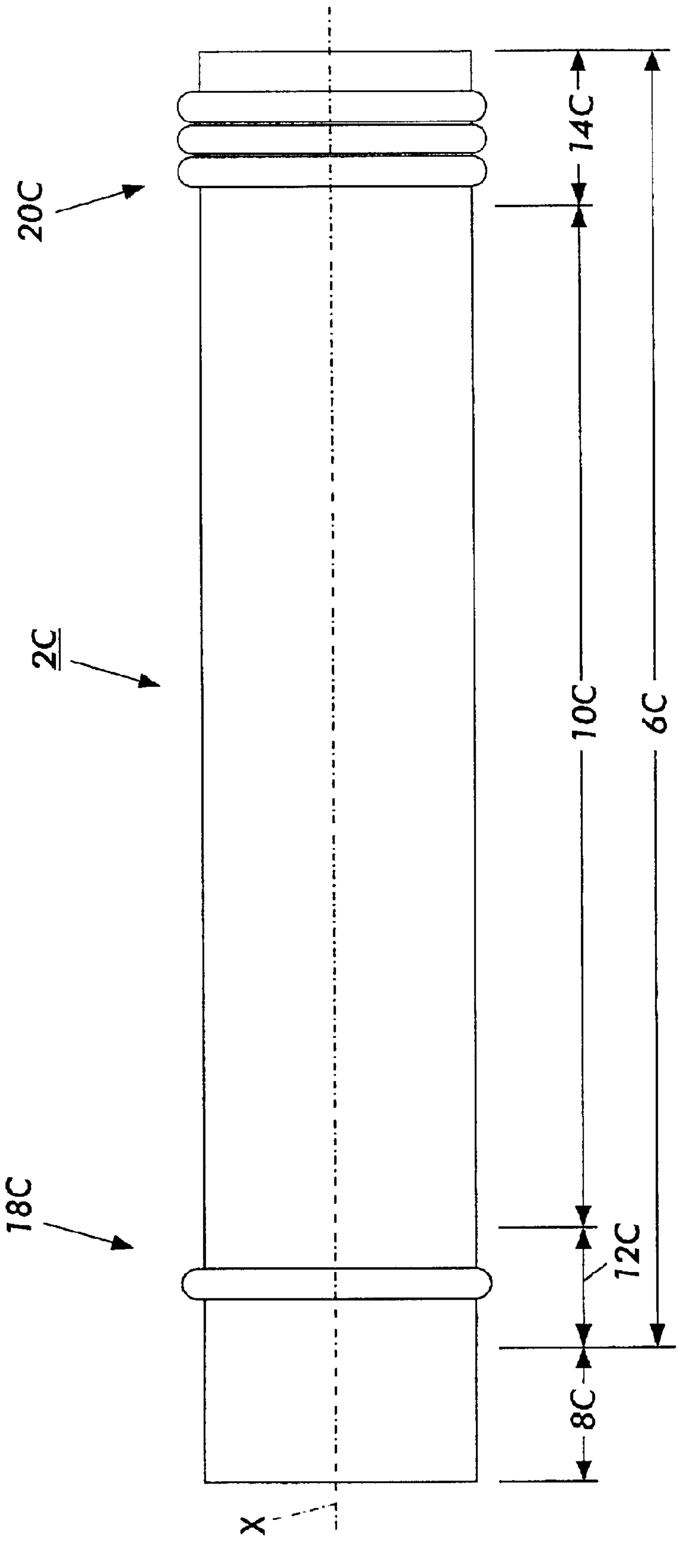
FIG. 3 is an elevational view of a third embodiment of the substrate useful in the present invention.

In FIG. 3, the first external member 18C and the second external member 20C are depicted as wires (having a circular shape when viewed in cross section along the longitudinal axis) that are disposed circumferentially around the respective first end region and the second end region in a continuous manner. The wires may be wrapped one time or several times around the first end region and the second end region.

Figure 4:
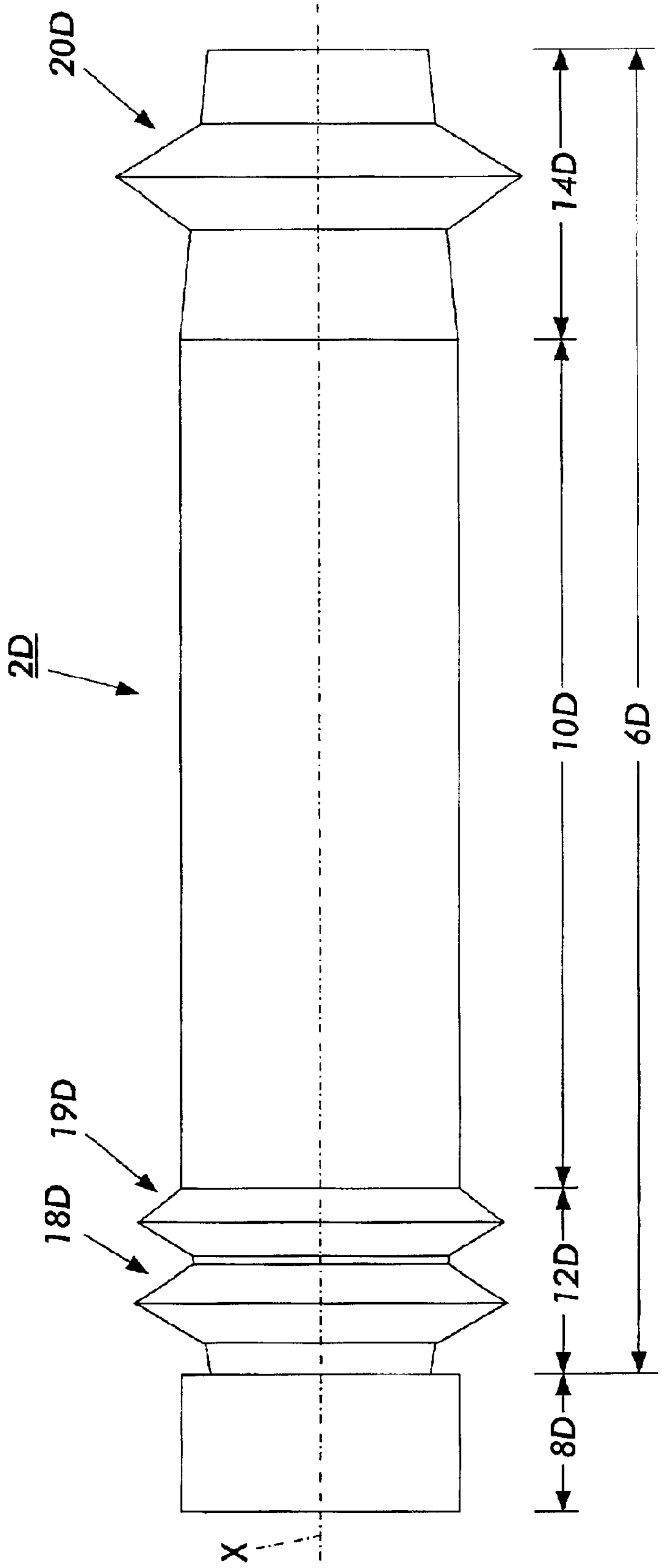
FIG. 4 is an elevational view of a fourth embodiment of the substrate useful in the present invention.

In FIG. 4, the first end region 12D includes a plurality of external members (18D, 19D), each external member is disposed circumferentially around the first end region in a continuous manner. Each external member (18D, 19D) is depicted as having a triangular shape when viewed in cross section along the longitudinal axis. The plurality of external members in the first end region may range in number for example from 2 to 5. The plurality of external members may be arranged in any suitable manner with respect to one another such as regular or irregular spacing and parallel or non-parallel arrangement. Moreover, each of the plurality of external members may be the same or different from one another in shape, surface height, size, and the like. The optional second external member 20D is depicted as a single band (having a triangular shape when viewed in cross section along the longitudinal axis) disposed circumferentially around the second end region in a continuous manner. In FIG. 4, the portions of the first end region 12D and the second end region 14D not covered by the external members are depicted as tapered surfaces.

Figure 5:
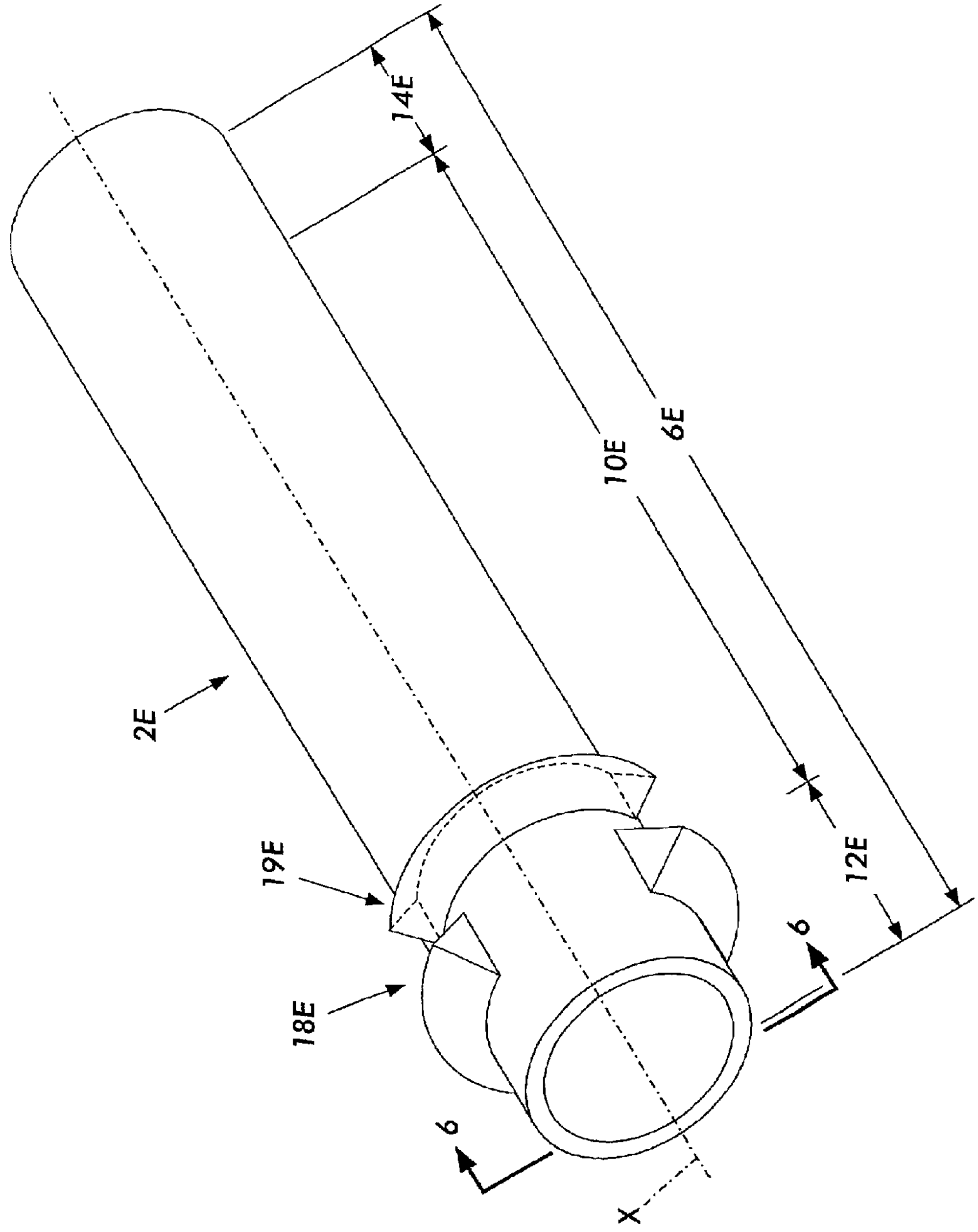
FIG. 5 is an elevational view of a fifth embodiment of the substrate useful in the present invention.
Figure 6:
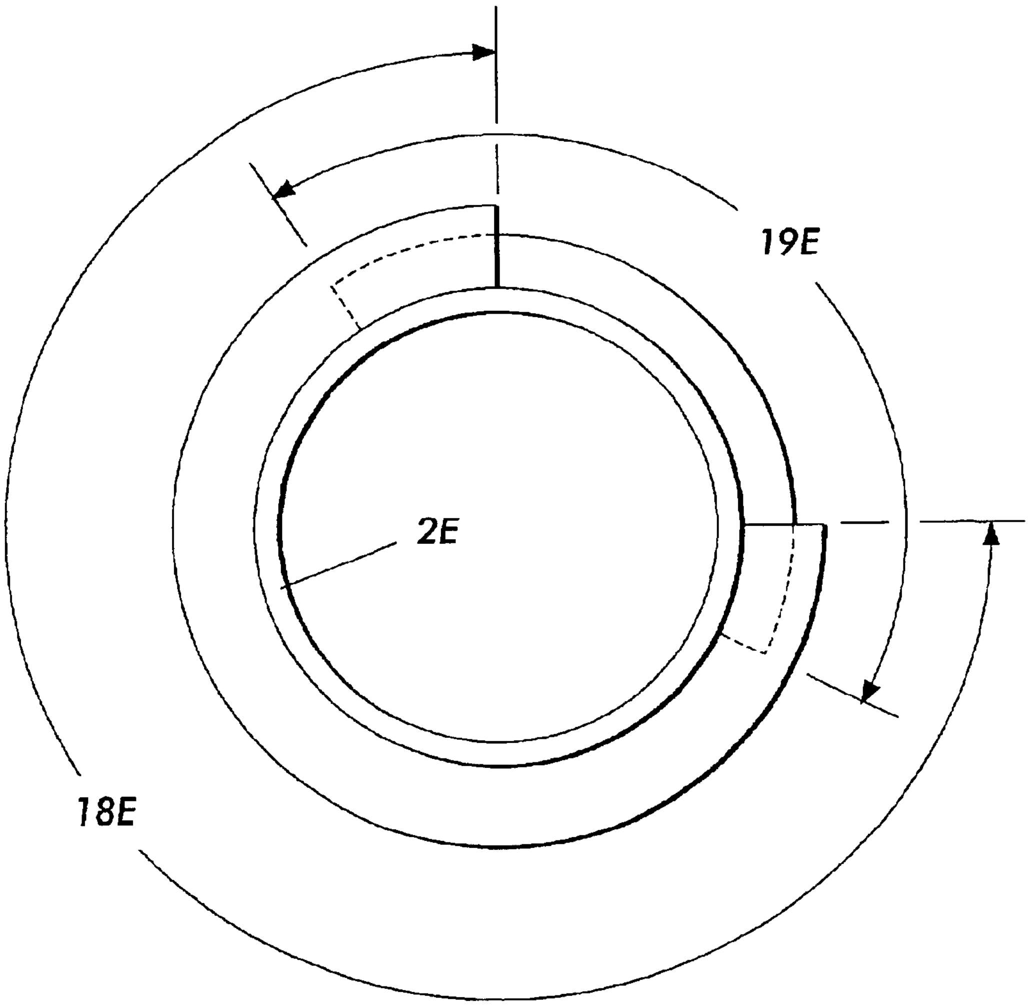
FIG. 6 is an end view of the substrate depicted in FIG. 5.

FIGS. 5–6 depict on the first end region 12E a plurality of external members (18E, 19E), each external member is disposed only partially around the first end region, wherein the plurality of the external members (18E, 19E), when viewed at a substrate end view, collectively extend circumferentially around the first end region in a continuous manner (also referred herein as "partial external members"). The plurality of partial external members may range in number from 2 to 5. The partial external members may be spaced at regular or irregular intervals (along the longitudinal axis) at a spacing ranging from 0 to about 1 cm, and particularly from about 1 mm to about 5 mm. In FIGS. 5–6, there are absent an uncoated region and any external member on the second end region.

In embodiments of the present invention, each external member protrudes above the level intermediate region by a value ranging for example from about 10 micrometers to about 10 mm, and particularly from about 0.5 mm to about 5 mm. Each external member may have a width (i.e., along the longitudinal axis) ranging for example from about 10 micrometers to about 100 mm, and particularly from about 0.5 mm to about 20 mm. Moreover, when viewed in cross section along the longitudinal axis, each external member may have any suitable shape such as circular, triangular (e.g., isosceles, equilateral, right, and obtuse), square, rectangular, half circle, and the like. The top surface of each external member when viewed in cross section along the longitudinal axis may be a straight line parallel to the longitudinal axis, a tapered line, a curved line, a peak, a series of steps, and the like. The external member or members may occupy a part of or all of the first end region. The external member or members may occupy a part of or all of the second end region. Different types of external members may be used. By disposing the external member or members circumferentially around one or both end regions in a continuous manner, the likelihood is eliminated or minimized that the coating solution will bypass the external member or members.

The external members may be rigid, semi-rigid, or flexible. Illustrative examples of the external members include a sheet material, a clamp, a ring, a tape, a wire (e.g., thin metal wire), an elastic band (e.g., rubber band, particularly a seamless rubber band), a fabric thread, and the like. The external members may be fabricated by any suitable technique including for example machining and extrusion.

The external members may be taken off the substrate subsequent to the formation of the dip coated layer or left permanently in place on the substrate subsequent to the dip coating. In embodiments, the external members are positioned on the substrate by employing a non-fastener technique (i.e., without employing a fastener) such as by stretching the external member to fit around the substrate (e.g., the external member is an elastic band) or tightly wrapping the external member around the substrate (e.g., the external member is a wire or a thread and possibly tying together the ends of the wire or thread). In other embodiments, one or more fasteners couple the external members to the substrate. The term "fastener" includes for example adhesives, screws, bolts, and the like.

The term "level" indicates that the particular surface at issue (e.g., intermediate region) is parallel to the longitudinal axis.

In embodiments, the dip coated layer exhibits a substantially uniform thickness over the entire deposition region, particularly over the intermediate region. The phrase "substantially uniform thickness" indicates that the dry coating thickness over the deposition region varies by no more than about 10%, particularly no more than about 5%, based on the largest thickness value of the dip coated layer.

The present method is believed to be based on the phenomenon of "capillary retention." When liquid is placed on a horizontal surface that is rough with a raised area and a depressed area, liquid will distribute more in the depressed areas per unit area due to surface tension of liquid and gravity. When such rough surface with liquid is positioned vertically, the liquid will flow downward. The contact angle based on the smooth surface is higher in the raised area than in the depressed area. Capillary force will exert driving force for the liquid to flow from the raised area to the depressed area. As a result, there is a higher percentage of liquid in the raised area flowing out. The most solution is retained in the depressed area, especially in the lower positions due to gravity. After the raised area is dip coated, the capillary force and gravity drag and deposit more of the coating solution in the surface area following the raised area. In the present invention, the external member functions as the raised area. Due to the presence of the external member, more of the coating solution is deposited in the dip coated layer over the intermediate region than would have occurred in the absence of the external member. Consequently, greater deposition of the coating solution over the intermediate region increases the coating thickness uniformity of the dip coated layer over the intermediate region. For photoreceptors, greater coating thickness uniformity of the dip coated layer in the imaging area improves performance as compared with a photoreceptor exhibiting pronounced sloping of the dip coated layer in the imaging area.

When the substrate is oriented vertically for dip coating, the first end region is considered the top end region and the second end region is considered the bottom end region. The dip coated layer is formed over the deposition region in the recited order: (1) over the first external member/optional exposed first end region portion; (2) over the intermediate layer; and (3) over the second end region and/or optional second external member.

The phrase "dip coating" encompasses the following techniques to deposit layered material onto a substrate: moving the substrate into and out of the coating solution; raising and lowering the coating vessel to contact the coating solution with the substrate; positioning the substrate in a vessel containing the coating solution and then draining the coating solution from the vessel.

The substrate may be moved into and out of the solution at any suitable speed including the takeup speed indicated in Yashiki et al., U.S. Pat. No. 4,610,942, the disclosure of which is hereby totally incorporated by reference. The dipping speed to contact the substrate with the coating solution may range for example from about 50 to about 3,000 mm/min and may be a constant or changing value. The takeup speed to withdraw the substrate from the coating solution may range for example from about 50 to about 500 mm/min and may be a constant or changing value. Any suitable dipping speed and takeup speed, including those discussed herein, can be used to deposit the desired layer or layers.

For the deposited layer or layers, each layer has a thickness ranging for example from about 0.05 to about 75 micrometers, and particularly from about 3 to about 40 micrometers. Unless otherwise indicated, the disclosed thickness value for each layer is a dry thickness value.

The substrate can be formulated entirely of an electrically conductive material, or it can be an insulating material having an electrically conductive surface. The substrate can be opaque or substantially transparent and can comprise numerous suitable materials having the desired mechanical properties. The entire substrate can comprise the same material as that in the electrically conductive surface or the electrically conductive surface can merely be a coating on the substrate. Any suitable electrically conductive material can be employed. Typical electrically conductive materials include metals like copper, brass, nickel, zinc, chromium, stainless steel; and conductive plastics and rubbers, aluminum, semitransparent aluminum, steel, cadmium, titanium, silver, gold, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. The substrate can vary in thickness over substantially wide ranges depending on its desired use. Generally, the conductive layer ranges in thickness from about 50 Angstroms to about 30 micrometers, although the thickness can be outside of this range. When a flexible electrophotographic imaging member is desired, the substrate thickness typically is from about 0.015 mm to about 0.15 mm. When a rigid, hollow imaging member is desired, the substrate thickness is typically from about 0.5 mm to about 5 mm. The substrate can be fabricated from any other conventional material, including organic and inorganic materials. Typical substrate materials include insulating non-conducting materials such as various resins known for this purpose including polycarbonates, polyamides, polyurethanes, paper, glass, plastic, polyesters such as MYLAR® (available from DuPont) or MELIEX® 447 (available from ICI Americas, Inc.), and the like. If desired, a conductive substrate can be coated onto an insulating material. In addition, the substrate can comprise a metallized plastic, such as titanized or aluminized MYLAR®. The substrate can be flexible or rigid, and can have any number of configurations such as a cylindrical drum, an endless flexible belt, and the like.

The substrate and coating solution are described herein as being used in the fabrication of a photoreceptor. However, the present invention is not limited to the fabrication of a photoreceptor. In embodiments, the present invention uses other substrates and coating solutions not specifically described herein which are useful for other applications.

Any suitable coating solution can be used to form the layer or layers deposited over the substrate. In embodiments, the coating solution may comprise materials typically used for any layer of a photoreceptor including such layers as a charge barrier layer, an adhesive layer, a charge transport layer, and a charge generating layer, such materials and amounts thereof being illustrated for instance in U.S. Pat. Nos. 4,265,990, 4,390,611, 4,551,404, 4,588,667, 4,596,754, and 4,797,337, the disclosures of which are totally incorporated by reference.

In embodiments, a coating solution may include the materials for a charge barrier layer including for example polymers such as polyvinylbutyral, epoxy resins, polyesters, polysiloxanes, polyamides, or polyurethanes. Materials for the charge barrier layer are disclosed in U.S. Pat. Nos. 5,244,762 and 4,988,597, the disclosures of which are totally incorporated by reference.

The optional adhesive layer preferably has a dry thickness between about 0.001 micrometer to about 0.2 micrometer. A typical adhesive layer includes film-forming polymers such as polyester, du Pont 49,000 resin (available from E. I. du Pont de Nemours & Co.). VITEL-PE100™ (available from Goodyear Rubber & Tire Co.), polyvinylbutyral, polyvinylpyrrolidone, polyurethane, polymethyl methacrylate, and the like. In embodiments, the same material can function as an adhesive layer and as a charge blocking layer.

In embodiments, a charge generating solution may be formed by dispersing a charge generating material selected from azo pigments such as Sudan Red, Dian Blue, Janus Green B, and the like; quinone pigments such as Algol Yellow, Pyrene Quinone, Indanthrene Brilliant Violet RRP, and the like; quinocyanine pigments; perylene pigments;

indigo pigments such as indigo, thioindigo, and the like; bisbenzoimidazole pigments such as Indofast Orange toner, and the like; phthalocyanine pigments such as copper phthalocyanine, aluminochloro-phthalocyanine, and the like; quinacridone pigments; or azulene compounds in a binder resin such as polyester, polystyrene, polyvinyl butyral, polyvinyl pyrrolidone, methyl cellulose, polyacrylates, cellulose esters, and the like. A representative charge generating solution comprises: 2% by weight hydroxy gallium phthalocyanine; 1% by weight terpolymer of vinyl acetate, vinyl chloride, and maleic acid; and 97% by weight cyclohexanone.

In embodiments, a charge transport solution may be formed by dissolving a charge transport material selected from compounds having in the main chain or the side chain a polycyclic aromatic ring such as anthracene, pyrene, phenanthrene, coronene, and the like, or a nitrogen-containing hetero ring such as indole, carbazole, oxazole, isoxazole, thiazole, imidazole, pyrazole, oxadiazole, pyrazoline, thiadiazole, triazole, and the like, and hydrazone compounds in a resin having a film-forming property. Such resins may include polycarbonate, polymethacrylates, polyarylate, polystyrene, polyester, polysulfone, styrene-acrylonitrile copolymer, styrene-methyl methacrylate copolymer, and the like. An illustrative charge transport solution has the following composition: 10% by weight N,N'-diphenyl-N,N'-bis(3-methylphenyl)-(1,1'-biphenyl)-4,4'diamine; 14% by weight poly(4,4'-diphenyl-1,1'-cyclohexane carbonate) (400 molecular weight); 57% by weight tetrahydrofuran; and 19% by weight monochlorobenzene.

A coating solution may also contain a liquid medium, preferably an organic liquid medium, such as one or more of the following: tetrahydrofuran, monochlorobenzene, and cyclohexanone.

After all the desired layers are coated onto the substrate, the coated layers may be subjected to elevated drying temperatures such as from about 100 to about 160° C. for about 0.2 to about 2 hours.

The invention will now be described in detail with respect to specific preferred embodiments thereof, it being understood that these examples are intended to be illustrative only and the invention is not intended to be limited to the materials, conditions, or process parameters recited herein. All percentages and parts are by weight unless otherwise indicated.

EXAMPLE 1

A commercially available endless rubber band of the following dimensions was used: about 1 mm thickness, about 2 mm width and about 150 mm full length. The substrate was a rigid cylindrical drum of about 30 mm in diameter and about 350 mm in length. The rubber band was wrapped around the drum twice with the two loops closely spaced to each other. The lower edge of the rubber band loops was about 5–10 mm from the top edge of the drum. The drum was then inserted into the coating solution until the surface of the solution reached the 8–9 mm from the top edge of the drum. The solution was about 300 centipoise in viscosity and about 25% in its solids content. The drum was pulled out of the solution steadily at about 150 mm per minute. After the drum was completely pulled out of the solution, it was removed from the dip coating apparatus and placed in a heated oven at about 130 degrees C. for 30 minutes to remove solvents. A commercial optical gauge was used to measure the thickness of the dried coating. The average thickness was calculated at about 30 mm from the top edge of the drum. Another average thickness was calculated in the major part of the drum between 100 and 300 mm from the top edge. The difference was used as the sloping. The sloping was about 1.78 micrometers.

Comparative Example 1

The procedures of Example 1 were followed except that no rubber band was used. The sloping about 2.39 micrometers. Thus, the improvement of sloping exhibited by Example 1 with a rubber band was about 0.61 micrometers or about 25% compared with Comparative Example 1.

EXAMPLE 2

A commercially available aluminum tape was used. The tape had a thickness of about 125 micrometers. The substrate was a rigid cylindrical drum of about 30 mm in diameter and about 350 mm in length. The tape was wrapped around the drum once. The lower edge of the tape was about 10–11 mm from the top edge of the drum. The upper edge of the tape was about 1–2 mm from the top edge of the drum. The drum was then inserted into the coating solution until the surface of the solution reached about 5–10 mm from the top edge of the drum. The solution was about 300 centipoise in viscosity and about 25% in its solids content. The drum was pulled out of the solution steadily at about 150 mm per minute. After the drum was completely pulled out of the solution, it was removed from the dip coating apparatus and placed in a heated oven at about 130 degrees C. for 30 minutes to remove solvents. A commercial optical gauge was used to measure the thickness of the dried coating. The average thickness was calculated at about 30 mm from the top edge of the drum. Another average thickness was calculated in the major part of the drum between 100 and 300 mm from the top of the edge. The difference was used as the sloping. The sloping was 1.95 micrometers.

Comparative Example 2

The procedures of Example 2 were followed except that no aluminum tape was used. The sloping was about 2.39 micrometers. Thus, the improvement of sloping exhibited by Example 2 with the aluminum tape was about 0.44 micrometers or about 18% compared with Comparative Example 2.

Other modifications of the present invention may occur to those skilled in the art based upon a reading of the present disclosure and these modifications are intended to be included within the scope of the present invention.

We claim:

1. An apparatus comprising:

(a) a substrate including a level intermediate region disposed between a first end region and a second end region;

(b) a first external member disposed circumferentially around the first end region in a continuous manner and protruding above the level intermediate region, thereby resulting in a deposition region including the surface of the first external member covering the first end region, an optional exposed first end region portion, and the intermediate region; and (c) a dip coated layer over the entire deposition region, wherein the portion of the dip coated layer over the first external member and the optional exposed first end region portion is formed prior to the portion of the dip coated layer over the intermediate layer.

2. The apparatus of claim 1, wherein there is absent a fastener joining the first external member to the first end region.

3. The apparatus of claim 1, further comprising a fastener to couple the first external member to the first end region.

4. The apparatus of claim 1, wherein the substrate is a cylinder.

5. The apparatus of claim 1, wherein the substrate includes an uncoated region.

6. The apparatus of claim 5, wherein the first external member extends into the uncoated region.

7. The apparatus of claim 1, wherein the first external member protrudes above the level intermediate region by a value ranging from about 10 micrometers to about 10 mm.

8. The apparatus of claim 1, wherein the first external member is an elastic band.

9. The apparatus of claim 1, wherein the first external member is a wire.

10. The apparatus of claim 1, wherein the first external member has a level top surface.

11. The apparatus of claim 1, wherein the dip coated layer comprises a charge transport material.

12. The apparatus of claim 1, wherein the portion of the dip coated layer over the intermediate region has a substantially uniform thickness.

13. The apparatus of claim 1, further comprising a second external member disposed circumferentially around the second end region in a continuous manner and protruding above the level intermediate region, and the deposition region includes the surface of the second external member covering the second end region and an optional exposed second end region portion.

14. The apparatus of claim 1, wherein the plurality of the external members ranges in number from 2 to 5.

15. An apparatus comprising:

(a) a substrate defining a longitudinal axis and including a level intermediate region disposed between a first end region and a second end region;

(b) a plurality of external members, each of the external members protruding above the level intermediate region and disposed only partially around the first end region, wherein the plurality of the external members, when viewed at a substrate end view, collectively extend circumferentially around the first end region in a continuous manner, thereby resulting in a deposition region including the surfaces of the external members covering the first end region, an optional exposed first end region portion, and the intermediate region; and (c) a dip coated layer over the entire deposition region, wherein the portion of the dip coated layer over the external members and the optional exposed first end region portion is formed prior to the portion of the dip coated layer over the intermediate layer.

16. A coating method comprising:

(a) providing an apparatus including:

(i) a substrate including a level intermediate region disposed between a first end region and a second end region;

(ii) a first external member disposed circumferentially around the first end region in a continuous manner and protruding above the level intermediate region, thereby resulting in a deposition region including the surface of the first external member covering the first end region, an optional exposed first end region portion, and the intermediate region; and (b) dip coating a layer of a coating solution over the entire deposition region, wherein the portion of the dip coated layer over the first external member and the optional exposed first end region portion is formed prior to the portion of the dip coated layer over the intermediate layer.

17. The coating method of claim 16, further comprising leaving permanently in place the first external member around the first end region subsequent to the dip coating.

18. The coating method of claim 16, wherein there is absent a fastener joining the first external member to the first end region.

19. The coating method of claim 16 wherein the apparatus further comprises a fastener to couple the first external member to the first end region.

* * * * *